US007675642B2

(12) United States Patent
Woo

(10) Patent No.: US 7,675,642 B2
(45) Date of Patent: Mar. 9, 2010

(54) PRINT APPARATUS AND PRINT METHOD

(75) Inventor: Hong-rok Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1128 days.

(21) Appl. No.: 11/292,122

(22) Filed: Dec. 2, 2005

(65) Prior Publication Data

US 2006/0119875 A1 Jun. 8, 2006

(30) Foreign Application Priority Data

Dec. 3, 2004 (KR) ............... 10-2004-0101023

(51) Int. Cl.
*G06K 15/00* (2006.01)
*G06F 3/12* (2006.01)
*H04N 1/40* (2006.01)

(52) U.S. Cl. .............. 358/1.15; 358/1.14; 358/1.16; 358/448

(58) Field of Classification Search .......... 358/1.13, 358/1.15, 1.16, 1.17, 1.9, 2.1, 3.24, 448, 358/452, 537, 538, 1.14
See application file for complete search history.

(56) References Cited

U.S. PATENT DOCUMENTS

| 6,717,601 | B2 * | 4/2004 | Sanger .................... 347/115 |
| 6,825,943 | B1 * | 11/2004 | Barry et al. ............... 358/1.15 |
| 2002/0051200 | A1 * | 5/2002 | Chang et al. .............. 358/1.15 |

FOREIGN PATENT DOCUMENTS

| JP | 02-123470 | 5/1990 |
| JP | 05-341769 | 12/1993 |
| JP | 2002-133429 | 5/2002 |
| JP | 2002-361933 | 12/2002 |
| KR | 2001-0107956 | 12/2001 |
| KR | 10-2002-0003756 A | 1/2002 |

* cited by examiner

*Primary Examiner*—James A Thompson
(74) *Attorney, Agent, or Firm*—Roylance, Abrams, Berdo & Goodman, L.L.P.

(57) ABSTRACT

A print apparatus and print method are provided in which the efficiency of a raster operation is improved according to destination images. The print method includes the steps of extracting a source image, a halftone image and a destination image from an image to be printed, determining an attribute of the destination image and converting raster operations (ROPs) of the source image, the halftone image and the destination image in accordance with the determination result, and performing the converted ROPs. If the attribute of the destination image is a written state, the conversion of the ROPs may be omitted, and if the attribute of the destination image is an initial state, the ROPs may be converted to more simplified operations using an initial state value of the destination image. Accordingly, by determining an attribute of the destination image D in advance, before the ROPs are performed, and converting the ROPs to simplified ROPs, the time required for rendering a result can be reduced and an entire printing time can be reduced.

15 Claims, 5 Drawing Sheets

FIG. 5A

ORIGINAL ROP = =S&~H&~D
IF D=1 (INITIAL STATE
(BLACK)), NEW ROP=0 char ubaTranslatedROPWithBlackD[256] =
};
                                                                                    16A

```
//0                    //4                //8              //c
  0,    0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
0x30,   0,   3,   3,   0,   0,   6,   3,  0x0c, 9,  0x0f, 0x33, 0x0c, 0x33, 0x33, 0,
};
```

FIG. 5B char ubaTranslatedROPWithWhiteD[256] =
{

> ORIGINAL ROP = =S&~H&~D
> IF D=0 (INITIAL STATE (WHITE)),
> NEW ROP=S&~H=1101b=0x0c

/16B

```
//0          //4                          //8                       //c
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f,
0, 3,  0,  0x0c, 0x0c, 0x0f, 0x06, 0,  0x0f, 0x09, 0,  3,  0x0c, 0x0c, 0x0c, 0x0f
};
```

PRINT APPARATUS AND PRINT METHOD

CROSS-REFERENCE TO RELATED APPLICATIONS

This application claims the benefit under 35 U.S.C §119(a) of Korean Patent Application No. 10-2004-0101023, filed in the Korean Intellectual Property Office on Dec. 3, 2004, the entire disclosure of which is incorporated herein by reference.

BACKGROUND OF THE INVENTION

1. Field of the Invention

The present invention relates to a print apparatus. More particularly, the present invention relates to a print apparatus and print method in which efficiency of a raster operation is improved according to destination images.

2. Description of the Related Art

Print apparatuses such as color printers and those referred to as all-in-ones, have an interpreting process of analyzing a print command received from a host and for creating a bitmap image. In particular, the interpreting process includes a rendering process of converting analyzed data into a bitmap image. That is, a cyan, magenta, yellow and black (CMYK) image or a red, green and blue (RGB) image, which is a color image received via a graphic device interface (GDI), is converted into a bitmap image. Here, in the print apparatuses, the CMYK image is mainly used.

FIG. 1 illustrates a rendering process of a conventional print apparatus.

Referring to FIG. 1, an RGB image or CMYK image 2 is represented in detail with combinations of a source image S indicating a shape of an object to be displayed, a halftone image H indicating inner texture such as a pattern and an attribute of the source image S, and a destination image D indicating a destination of the source image S. Raster operations (ROPs) 3 comprise 256 ROPs defined by logical operations, such as logical AND, logical OR and logical NOT operations, using the combinations of the source image S, the halftone image H and the destination image D. Data, which is stored in a memory 4, corresponding to the source image S, the halftone image H and the destination image D, is computed using the ROPs, and a created bitmap image is output via the memory.

FIG. 2 is a block diagram of a conventional print apparatus.

Referring to FIG. 2, the conventional print apparatus receives a print command via a graphic device interface (GDI) (not shown). The received print command is analyzed to determine the source image S, the halftone image H and the destination image D by a parser 5 and a decoder 6. An ROP unit 7 performs the ROPs of the analyzed source image S, halftone image H and destination image D, and outputs a bitmap image created as the analysis result via a memory unit 8.

Here, the ROP unit 7 performs the ROPs of the source image, halftone image and destination image data stored in relevant memories regardless of an attribute of the destination image D. Accordingly, the efficiency of the rendering process decreases due to the excessive computation time resulting from the complexity of the ROPs.

Accordingly, a need exists for a system and method in which the efficiency of a raster operation is improved.

SUMMARY OF THE INVENTION

The present invention substantially solves the above and other problems, and provides a print apparatus in which the efficiency of a raster operation (ROP) is improved according to a destination image.

The present invention further provides a print method in which the efficiency of an ROP is improved according to a destination image.

According to an aspect of the present invention, a print method is provided comprising the steps of extracting a source image, a halftone image and a destination image from an image to be printed, determining an attribute of the destination image and converting raster operations (ROPs) of the source image, the halftone image and the destination image in accordance with the determination result, and performing the converted ROPs.

If the attribute of the destination image is a written state, the conversion of the ROPs may be omitted, and if the attribute of the destination image is an initial state, the ROPs may be converted to more simplified operations using an initial state value of the destination image.

If the attribute of the destination image is a white state (0) of the initial state, the ROPs may be converted to more simplified operations using 0 which is a destination image value, and if the attribute of the destination image is a black state (1) of the initial state, the ROPs may be converted to more simplified operations using 1 which is a destination image value.

The converted ROPs may be separately stored in a predetermined memory area.

The print method may further comprise the step of outputting a bitmap image created as a result of performing the ROPs.

According to another aspect of the present invention, a print apparatus is provided comprising an extraction unit for extracting a source image, a halftone image and a destination image from an image to be printed, a conversion unit for determining an attribute of the destination image and for converting raster operations (ROPs) of the source image, the halftone image and the destination image in accordance with the determination result, and an ROP unit for performing the converted ROPs.

According to another aspect of the present invention, a print method is provided comprising the steps of reading a map of raster operations (ROPs), which are converted to more simplified operations in accordance with an attribute of a destination image, from a predetermined memory area, and performing relevant converted ROPs of a source image, a halftone image and the destination image of an image to be printed with reference to the read map of the converted ROPs.

According to another aspect of the present invention, a print apparatus is provided comprising a storage unit for storing a map of raster operations (ROPs) which are converted to more simplified operations in accordance with an attribute of a destination image, and an ROP unit for performing relevant converted ROPs of a source image, a halftone image and the destination image of an image to be printed with reference to the map of the converted ROPs read from the storage unit.

BRIEF DESCRIPTION OF THE DRAWINGS

The above and other features and advantages of the present invention will become more apparent by describing in detail exemplary embodiments thereof with reference to the attached drawings, in which:

FIGS. 5A and 5B are examples of an ROP conversion map preferably required for the rendering process according to an embodiment of the present invention.

Throughout the drawings, like reference numerals will be understood to refer to like parts, components and structures.

DETAILED DESCRIPTION OF THE EXEMPLARY EMBODIMENTS

Hereinafter, exemplary embodiments of the present invention will now be described in detail with reference to the accompanying drawings.

Since raster operations (ROPs) comprise operations using combinations of a source image S, a halftone image H and a destination image D, a rendering processing speed varies in accordance with the complexity of the ROPs. In exemplary embodiments of the present invention, rendering efficiency is improved by simplifying the ROPs in response to a state of the destination image D among the three elements of the ROPs.

Figure 1:
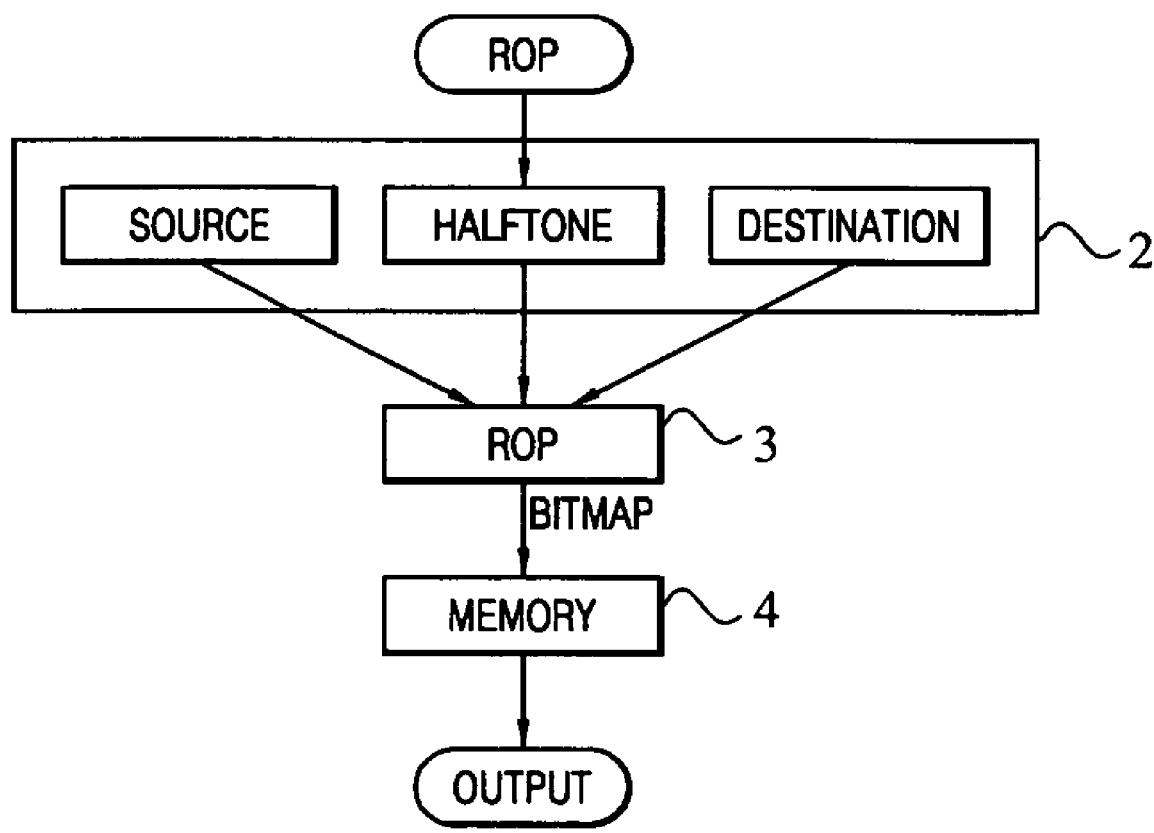
FIG. 1 illustrates a rendering process of a conventional print apparatus.
Figure 2:
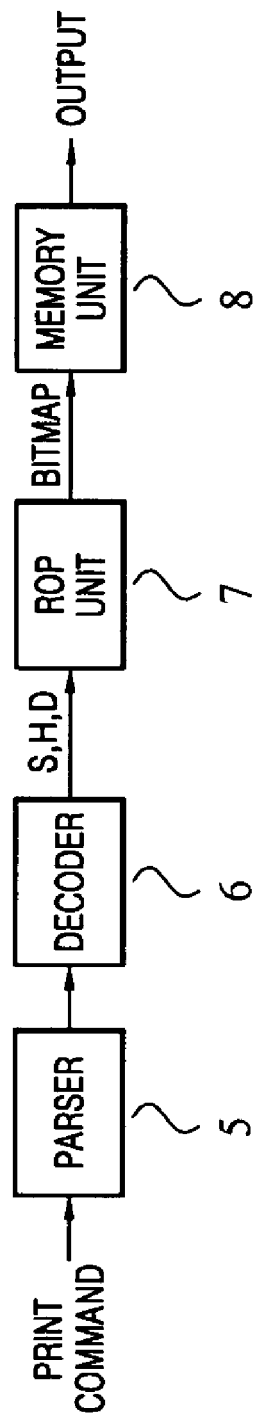
FIG. 2 is a block diagram of the conventional print apparatus.
Figure 3:
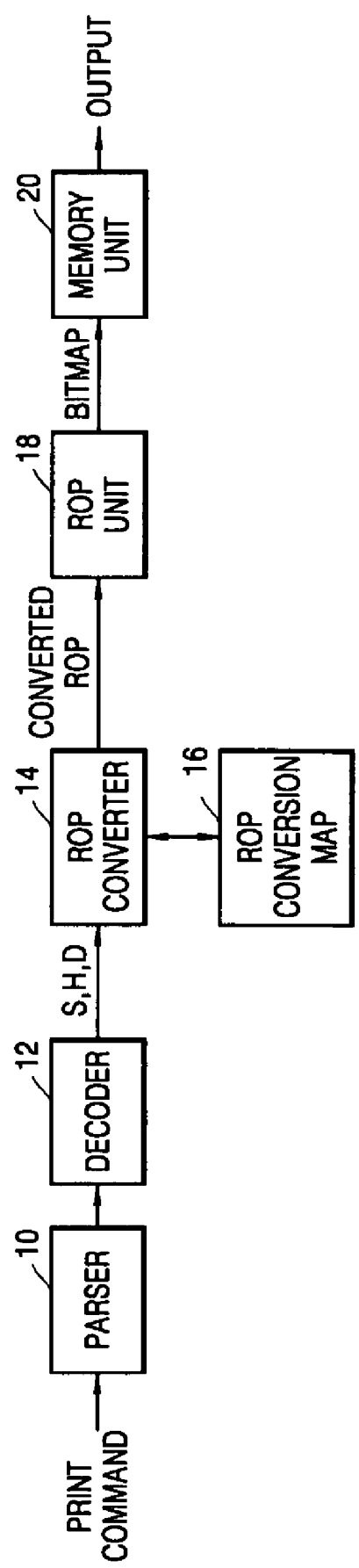
FIG. 3 is a block diagram of a print apparatus according to an embodiment of the present invention.

FIG. 3 is a block diagram of a print apparatus according to an embodiment of the present invention.

Referring to FIG. 3, the print apparatus comprises a parser 10, a decoder 12, an ROP converter 14, an ROP conversion map 16, an ROP unit 18 and a memory unit 20.

The parser 10 and the decoder 12 obtain a source image S, a halftone image H and a destination image D by analyzing a print command received from a graphic device interface (GDI) (not shown). The ROP converter 14 simplifies ROPs by considering a state of the destination image D among the analyzed source image S, halftone image H and destination image D. Here, the ROP conversion map 16 is used to simplify the ROPs. A detailed method of simplifying the ROPs using the ROP conversion map 16 will be described in greater detail below. The ROP unit 18 performs the new ROPs, which have been simplified by the ROP converter 14, of the source image S, halftone image H and destination image D. A bitmap image created as a result of performing the ROPs is stored in the memory unit 20, and can then be output.

Figure 4:
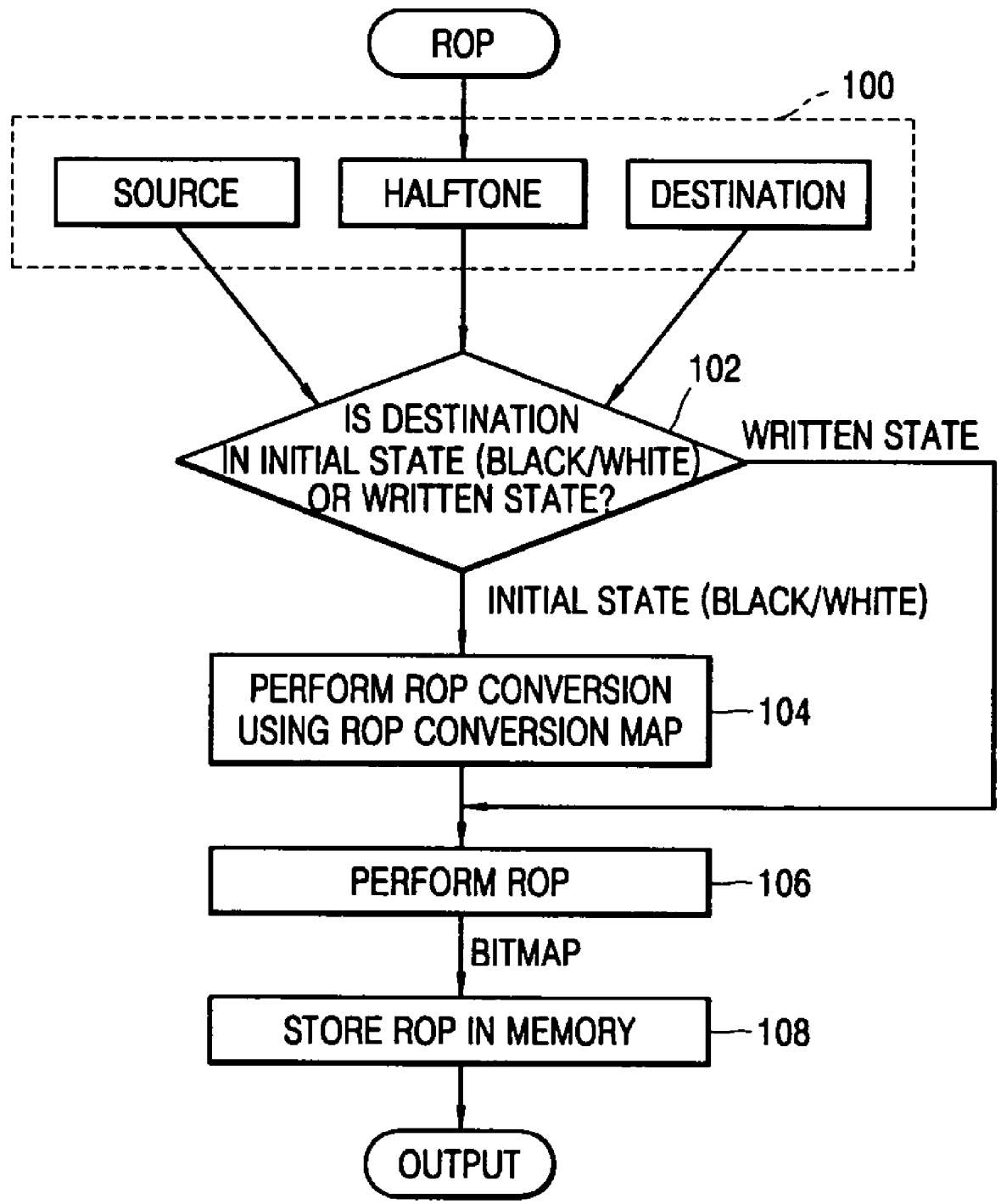
FIG. 4 illustrates a rendering process according to an embodiment of the present invention.

FIG. 4 illustrates a rendering process according to an embodiment of the present invention.

Referring to FIG. 4, a source image S, a halftone image H and a destination image D, which form a CMYK image, are extracted by analyzing a print command in operation 100, and it is determined whether the destination image D of the extracted images is in an initial state or a written state in operation 102. If the destination image D is in the written state, ROPs cannot be simplified any further. Accordingly, the ROPs are performed in operation 106, and a bitmap image created as a result of performing the ROPs is output through the memory unit 20 in operation 108.

If the destination image D is in the initial state, that is, a black or white state, the ROPs are converted to new simplified ROPs with reference to the ROP conversion map 16, described in greater detail below, in operation 104. If the destination image D is a black color, then D=1, and if the destination image D is a white color, then D=0. Accordingly, the ROPs comprising operations such as logical AND, logical OR and logical NOT operations, can be converted to more simplified ROPs. The new simplified ROPs are then performed in operation 106, and a bitmap image created as a result of performing the ROPs is output through the memory unit 20 in operation 108.

In the conventional ROPs, predefined ROPs are performed for memory data of the source image S, halftone image H and destination image D regardless of an attribute of the destination image D. However, in embodiments of the present invention, a rendering time using the ROPs can be reduced by determining whether the destination image D has already been written before the ROPs are performed or whether the destination image D is in the black/white state, which is the initial state, before converting the predefined ROPs to more simplified ROPs.

The method of simplifying the ROPs using the ROP conversion map 16 will now be described in greater detail.

FIGS. 5A and 5B are examples 16A AND 16B of the ROP conversion map 16 that is preferably required for the rendering process according to an embodiment of the present invention. FIG. 5A is an ROP conversion map 16A of a case wherein the destination image D is the black color, which is an initial state, and FIG. 5B is an ROP conversion map 16B of a case where the destination image D is the white color, which is also an initial state. Referring to FIG. 5A, the ROP conversion map 16A can be defined by an arrangement or a matrix including 256 ROP values, 16 values of 0 to f hexadecimal in width and 16 values in length.

For example, an original ROP corresponding to 4 hexadecimal is represented by,

S&~H&~D, that is, the logical AND of the source image S, logical NOT of the halftone image H and logical NOT of the destination image D. Here, since the destination image D is the black color, D=1. If the D value is substituted for the original ROP, the original ROP becomes,

S&~H&~(1), and since ~(1) corresponds to 0, the original ROP becomes,

S&~H&0, and since a result of the logical AND including 0 becomes 0, the original ROP becomes 0. Accordingly, there is no need to perform the ROP. Referring back to FIG. 5A, converted new ROPs corresponding to 4 hexadecimal are defined as 0.

FIG. 5B is the ROP conversion map 16B of a case wherein the destination image D is the white color, which is an initial state. Referring to FIG. 5B, for example, the original ROP corresponding to 4 hexadecimal is,

S&~H&~D, as described above. Here, since the destination image D is the white color, D=0. If the D value is substituted for the original ROP, the original ROP becomes,

S&~H&~(0), and since ~(0) corresponds to 1, the original ROP becomes,

S&~H&1, and since a result of the logical AND including 1 becomes itself, the original ROP becomes,

S&~H.

Accordingly, the original ROP can be converted to a more simplified ROP.

In a similar manner, when the destination image D is the black color (1), a large portion of the 256 ROPs can be converted to more simplified ROPs using the ROP conversion map 16. The more complex that the ROPs are, the longer the time required for rendering a result. Therefore, if an attribute of the destination image D is determined in advance before the ROPs are performed and the ROPs are converted to simplified ROPs based upon the determination, the time required for rendering a result can be reduced, and an entire printing time can be reduced.

In a print apparatus, since more than 80~90% of destination images are black or white, the efficiency of rendering can be improved according to the kinds of ROPs, and an increase of efficiency of 10~20% can be expected in the print apparatus by applying embodiments of the present invention thereto.

As described above, the ROP conversion map can be implemented as an arrangement as shown in FIGS. 5A and 5B, but is not limited thereto. In yet other embodiments of the present invention, the ROP conversion map can be implemented using various other data structures.

A print method in which the efficiency of ROPs is improved according to destination images according to embodiments of the present invention can be written as computer programs. The codes and code segments for embodying the computer programs may be easily determined by programmers skilled in the art. The programs can be stored in a computer-readable recording medium and implemented in general-use digital computers that execute the programs in order to implement the print method in which the efficiency of ROPs is improved according to destination images. Examples of the computer-readable recording medium comprise magnetic storage media (for example, ROM, floppy disk, hard disk, and so forth), optical recording media (for example, CD-ROM, DVD, and so forth), and storage media such as carrier waves (for example, transmission via the internet).

As described above, according to embodiments of the present invention, a print apparatus and print method are provided in which the efficiency of ROPs is improved.

That is, by determining an attribute of the destination image D in advance, before the ROPs are performed and converting the ROPs to simplified ROPs, the time required for rendering can be reduced, and an entire printing time can be reduced. In a print apparatus, since more than 80~90% of destination images are black or white, the efficiency of rendering can be improved according to kinds of ROPs, and an increase of efficiency of 10~20% can be expected in the print apparatus by applying the embodiments of the present invention thereto.

While the present invention has been particularly shown and described with reference to exemplary embodiments thereof, it will be understood by those skilled in the art that various changes in form and details may be made therein without departing from the spirit and scope of the invention as defined by the appended claims. The above-described embodiments should be considered in a descriptive sense only and are not for purposes of limitation. Therefore, the scope of the invention is defined not by the detailed description of the invention, but by the appended claims, and all differences within the scope will be construed as being included in the present invention.

What is claimed is:

1. A print method, comprising the steps of:
    extracting a source image, a halftone image and a destination image from an image to be printed;
    determining an attribute of the destination image and converting raster operations (ROPs) of the source image, the halftone image and the destination image in accordance with the determination result; and
    performing the converted ROPs;
    wherein if the attribute of the destination image is a written state, the conversion of the ROPs is omitted; and
    if the attribute of the destination image is an initial state, the ROPs are converted to more simplified operations using an initial state value of the destination image.

2. The method of claim 1, wherein:
    if the attribute of the destination image is a white state (0) of the initial state, the ROPs are converted to more simplified operations using 0 which is a destination image value.

3. The method of claim 1, wherein:
    if the attribute of the destination image is a black state (1) of the initial state, the ROPs are converted to more simplified operations using 1 which is a destination image value.

4. The method of claim 1, wherein the converted ROPs are separately stored in a predetermined memory area.

5. The method of claim 1, further comprising the step of:
    outputting a bitmap image created as a result of performing the ROPs.

6. A print apparatus, comprising:
    an extraction unit for extracting a source image, a halftone image and a destination image from an image to be printed;
    a conversion unit for determining an attribute of the destination image and converting raster operations (ROPs) of the source image, the halftone image and the destination image in accordance with the determination result; and
    an ROP unit for performing the converted ROPs;
    wherein the conversion unit is configured to omit the conversion of the ROPs if the attribute of the destination image is a written state, and is configured to convert the ROPs to more simplified operations using an initial state value of the destination image if the attribute of the destination image is an initial state.

7. The apparatus of claim 6, wherein the conversion unit is further configured to convert the ROPs to more simplified operations using 0 which is a destination image value if the attribute of the destination image is a white state (0) of the initial state.

8. The apparatus of claim 6, further comprising:
    a predetermined memory area for separately storing the converted ROPs.

9. The apparatus of claim 6, wherein the conversion unit is further configured to convert the ROPs to more simplified operations using 1 which is a destination image value if the attribute of the destination image is a black state (1) of the initial state.

10. The apparatus of claim 6, further comprising:
    an outputting unit for outputting a bitmap image created as a result of performing the ROPs.

11. A print method, comprising the steps of:
    reading a map of raster operations (ROPs) which are converted to more simplified operations in accordance with an attribute of a destination image from a predetermined memory area; and performing converted ROPs of a source image, a halftone image and the destination image of an image to be printed with reference to the read map of the converted ROPs;

wherein the map of the converted ROPs comprises at least one of:

results obtained by converting the ROPs to more simplified operations using 0 which is a destination image value if the attribute of the destination image is a white state (0) of the initial state; and results obtained by converting the ROPs to more simplified operations using 1 which is a destination image value if the attribute of the destination image is a black state (1) of the initial state.

12. A print apparatus, comprising:

a storage unit for storing a map of raster operations (ROPs) which are converted to more simplified operations in accordance with an attribute of a destination image; and an ROP unit for performing converted ROPs of a source image, a halftone image and the destination image of an image to be printed with reference to the map of the converted ROPs read from the storage unit;

wherein the map of the converted ROPs comprises at least one of:

results obtained by converting the ROPs to more simplified operations using 0 which is a destination image value if the attribute of the destination image is a white state (0) of the initial state; and results obtained by converting the ROPs to more simplified operations using 1 which is a destination image value if the attribute of the destination image is a black state (1) of the initial state.

13. A computer-executable program embodied on a computer-readable medium for controlling printing of a device, comprising:

a first set of instructions for extracting a source image, a halftone image and a destination image from an image to be printed;

a second set of instructions for determining an attribute of the destination image and converting raster operations (ROPs) of the source image, the halftone image and the destination image in accordance with the determination result; and a third set of instructions for performing the converted ROPs;

wherein:

if the attribute of the destination image is a written state, the conversion of the ROPs is omitted; and if the attribute of the destination image is an initial state, the ROPs are converted to more simplified operations using an initial state value of the destination image.

14. The computer-executable program embodied on a computer-readable medium of claim 13, wherein:

if the attribute of the destination image is a white state (0) of the initial state, the ROPs are converted to more simplified operations using 0 which is a destination image value; and if the attribute of the destination image is a black state (1) of the initial state, the ROPs are converted to more simplified operations using 1 which is a destination image value.

15. The computer-executable program embodied on a computer-readable medium of claim 13, further comprising:

a fourth set of instructions for outputting a bitmap image created as a result of performing the ROPs.

* * * * *